(12) United States Patent
Von Riegen (10) Patent No.: US 7,822,778 B1
(45) Date of Patent: Oct. 26, 2010

(54) EXTENDED UDDI WITH ITEM REGISTRY FUNCTIONALITY

(75) Inventor: Claus H. Von Riegen, Wiesloch (DE)

(73) Assignee: SAP AG, Walldorf (DE)

( * ) Notice: Subject to any disclaimer, the term of this patent is extended or adjusted under 35 U.S.C. 154(b) by 1274 days.

(21) Appl. No.: 10/745,134

(22) Filed: Dec. 22, 2003

(51) Int. Cl.
G06F 7/00 (2006.01)
G06F 17/30 (2006.01)

(52) U.S. Cl. .................................................... 707/802

(58) Field of Classification Search ................ 707/802, 707/999.1
See application file for complete search history.

(56) References Cited

U.S. PATENT DOCUMENTS

| | | | |
|---|---|---|---|
| 6,820,083 B1 * | 11/2004 | Nagy et al. ................... | 707/9 |
| 2002/0069096 A1 * | 6/2002 | Lindoerfer et al. ............. | 705/7 |
| 2002/0143819 A1 * | 10/2002 | Han et al. .................... | 707/513 |
| 2004/0133580 A1 * | 7/2004 | Liu et al. .................... | 707/100 |
| 2004/0202330 A1 * | 10/2004 | Harvey et al. ............... | 380/277 |
| 2004/0205084 A1 * | 10/2004 | Harvey et al. ............... | 707/102 |

OTHER PUBLICATIONS

Oasis, "UDDI Version 2.03 Data Structure Reference, UDDI Committee Specification, Jul. 19, 2002," 1-30.*
Oasis, "UDDI Version 2.04 API Specification, UDDI Committee Specification, Jul. 19, 2002," 1-82.*
Bannon et al., "Semantic Web Data Desciption and Discovery," Sep. 12, 2003, 1-11.*
W3Schools, "XML Elements" (http://web.archive.org/web/20000817074310/www.w3schools.com/xml/xml_elements.asp), Aug. 17, 2000, 1-4.*
Perfectxml.com, "Focus Web Services Introduction", pp. 1-3, Oct. 13, 2003, www.perfectxml.com/WebSvc1.asp.
Cerami, E., O'Reilly Network: "Top Ten FAQs for Web Services", pp. 1-7, Oct. 13, 2003, www.oreillynet.com/lpt/a//webservices/2002/02/12/webservicefaqs.html.
Systinet, Corp., "Introduction to UDDI", pp. 1-2, Oct. 13, 2003, www.systinet.com/doc/wasp_jserver/primerj/introduction_to_uddi.htm.
UCCnet, Inc., Home: "Welcome to UCCnet", pp. 1, Mar. 9, 2004, http://knowledgebase.uccnet.org/.
Uniform Code Council, Inc., "UNSPSC Homepage", pp. 1, Mar. 9, 2004, www.unspsc.org/.
Oasis, "Specifications, Best practices, Technical Notes", pp. 1, Mar. 9, 2004, www.uddi.org/specification.html.
Pramati Technologies, "Introduction", pp. 1-2, Oct. 13, 2003, www.pramati.com/docstore/1205007/webhelp/introduction.html.
Cape Clear Software, Inc., "Web Services Introduction", pp. 1, Oct. 13, 2003, www.capeclear.com/products/webservices/index.shtml.

(Continued)

*Primary Examiner*—John E Breene
*Assistant Examiner*—Aleksandr Kerzhner
(74) *Attorney, Agent, or Firm*—Blakely, Sokoloff, Taylor & Zafman (57) ABSTRACT

A method for extending Universal Description, Discovery and Integration ("UDDI") registry is disclosed. Information of at least one item provided in a UDDI registry is published by a Web Service provider utilizing an item data structure. An item in the UDDI registry may them be searched utilizing at least one Application Program Interface ("API") associated with the item data structure.

25 Claims, 6 Drawing Sheets

OTHER PUBLICATIONS

Gardner, T., Main Articles: "An Introduction to Web Services", pp. 1-6, Oct. 13, 2003, www.ariadne.ac.uk/issue29/gardner/.

Oasis, "UDDI Version 2.03 Data Structure Reference UDDI Committee Specification, Jul.19, 2002" pp. 1-30, Sep. 24, 2003, http://uddi.org/pubs/DataStructure-V2.03-Published-200220719.htm.

Global Data Synchronisation Group, "Global Master Data Synchronisation Process", Business Requirement, Vision, Concept and Recommendations, Report 1-Version-V1.0, pp. 1-34, 2nd Edition- 14th Dec. 2001.

Global Data Synchronisation Group, "Global Master Data Synchronisation Process", Detailed Specifications of Global Registry, Global Search Function and Flow of Messages, Report 2—Version V 0.5, pp. 1-57, 2nd Edition- 28th Mar. 2002.

Global Data Synchronisation Group, "Global Master Data Synchronisation Process", Detailed Specifications of the Technical Certification of Data Pools and the Global Registry, Report 3—Version V 0.3, pp. 1-30, Mar. 28th, 2002.

Uniform Code Council, Inc, GTIN Implementation Guidelines, "Global Trade item Numbers (GTIN) Application Guideline", pp. 1-15, 2001, printed document on Apr. 2, 2002.

UNSPSC, Frequently Asked Questions, http://www.unspsc.org/FAQs.asp, printed on Apr. 24, 2008, 8 pages.

* cited by examiner

EXTENDED UDDI WITH ITEM REGISTRY FUNCTIONALITY

FIELD

Embodiments of the invention pertain to the fields of Web Services. More particularly, embodiments of the invention relate to extending Universal Description, Discovery and Integration (UDDI) standard-based registry with additional functionality to capture item information.

BACKGROUND

The term "Web Services" has gained visibility in recent years, as various big industry players announce their Web Services strategies. Web Services are standards-based software components providing a variety of internet-based services. Web services can vary in function from simple operations, for example, the retrieval of a stock quote over the Internet, to complex business operations, which access and combine information from multiple sources. Once a Web Service is deployed, other applications and Web Services can discover and exchange data with the service in a standardized manner.

Figure 1:
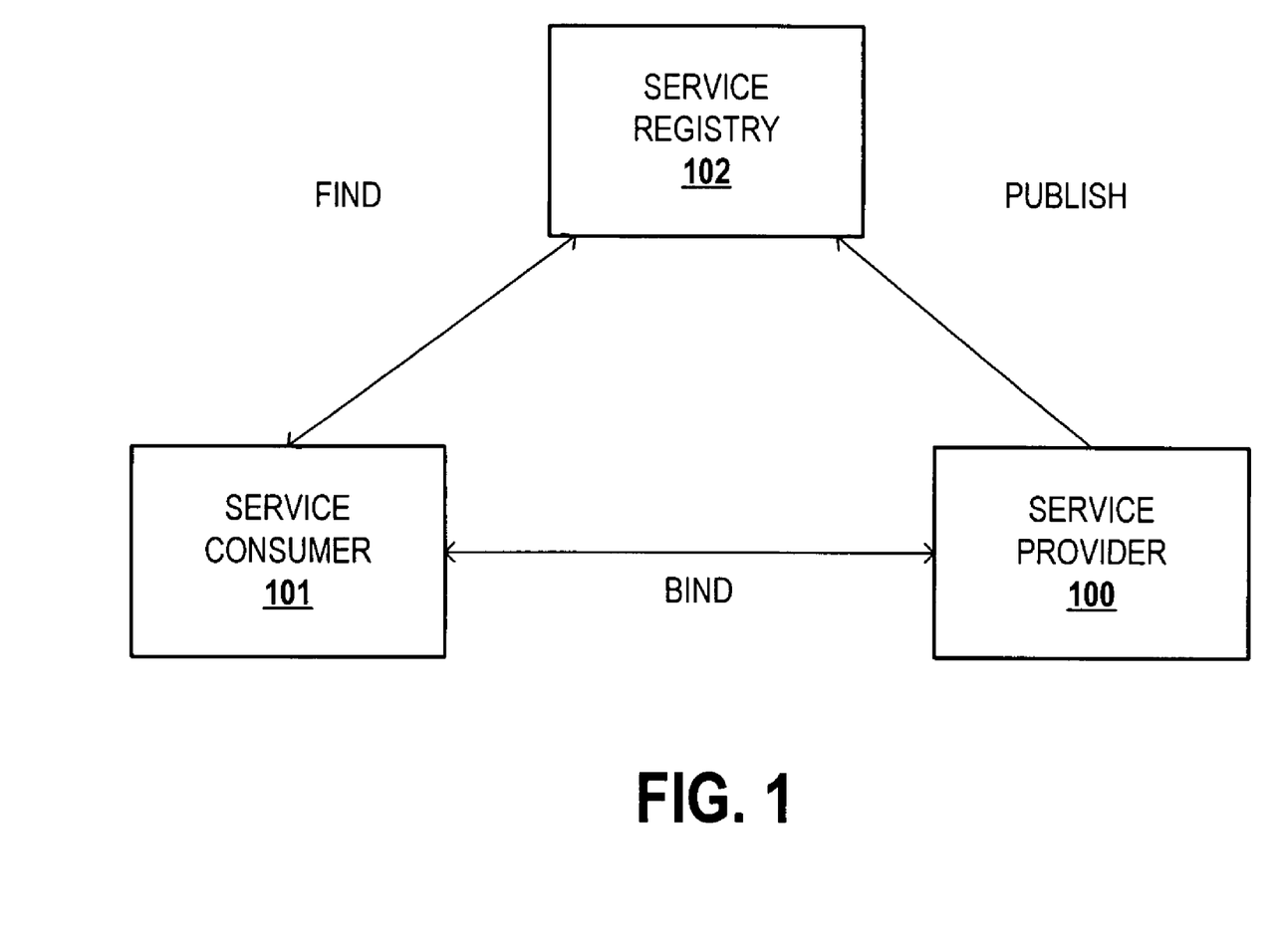
FIG. 1 illustrates a high-level architecture of Web Service and item registry functionality according to one embodiment of the invention.

FIG. 1 illustrates high-level architecture of Web Services. Service providers 100 publish information about their Web Services into a service registry 102, allowing service consumers 101 to search for particular Web Services in the registry, and bind applications with those Web Services. The service registry 102 is a Universal Description, Discovery, and Integration ("UDDI") standard-complying registry. The UDDI registry includes white pages, yellow pages and green pages. White pages contain contact information of Web Services providers, such as addresses and phone numbers, yellow pages contain industry classifications and green pages contain description of services provided by service providers.

However, the UDDI registry does not include information about specific items (e.g., offered products and/or services) provided by Web Service providers 100. If a Web Service consumer 101 is searching for a particular item, the consumer must first query the UDDI registry for Web Service providers that provide services in the field to which the particular item belongs. The consumer must then contact the Web Service providers individually to determine whether any of the identified providers offer specific items that the consumer is looking for.

In addition, existing item registries often do not include supplemental information related to the electronic communication capabilities of each item supplier. In this case, after finding appropriate item suppliers, the consumer must then contact the item suppliers individually to determine whether any of them offers specific Web services the consumer is capable of interacting with.

What is needed, therefore, is a solution that overcomes these and other shortcomings of the prior art.

SUMMARY

A method for extending Universal Description, Discovery and Integration ("UDDI") registry is disclosed. Embodiments of the invention include publishing information of at least one item (e.g., product) provided in a UDDI registry by a Web Service provider utilizing at least one Publication Application Programming Interface ("API") associated with an item data structure. Embodiments of the invention further include searching for an item in the UDDI registry utilizing at least one Inquiry API associated with the item data structure.

BRIEF DESCRIPTION OF THE DRAWINGS

The invention is illustrated by way of example and not limitation in the figures of the accompanying drawings, in which like references indicate similar elements and in which.

DETAILED DESCRIPTION

A method and apparatus for extension of functionality of a UDDI standard-based registry are disclosed. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

Brief Introduction to UDDI Standard

Universal Description, Discovery and Integration ("UDDI") is a standard developed by the Organization for the Advancement of Structured Information Standards ("OASIS") which describes the behavior of Web service registries, including the inquiry and publishing functions of Web services, their types and their providers. While the UDDI information model provides details about the naming, description, identification, categorization and relationships of the UDDI entities, the UDDI Application Programming Interfaces ("APIs") allow this information to be updated, created, replicated and deleted. UDDI specifications, version 2.0 and version 3.0, can be accessed through the OASIS UDDI Member Section Web site FIG. 1 illustrates a high-level Web Services architecture, wherein service providers 100 utilize UDDI Publication APIs to publish information about their services in the UDDI service registry 102. Service consumers 101 may then utilize the UDDI Inquiry APIs to query the UDDI service registry 102 to identify suitable Web Services provided by the Web Service providers 100. Once the Web Services and their interfaces are identified in response to the query, the service consumers 101 may bind their applications to the Web Service applications utilizing the identified interfaces.

Methodology

As stated in the background section of the present application, the UDDI standards-based registry does not contain information about specific items provided by Web Service providers. In addition, the UDDI standard does not include APIs that allow service consumers to query the UDDI standard-based registry for specific items. According to one embodiment of the invention, in order to provide publication and discovery services for specific items, new data structures and a corresponding set of APIs are specified as an extension to the functionality provided by the UDDI specifications.

Data Structures

Figure 2:
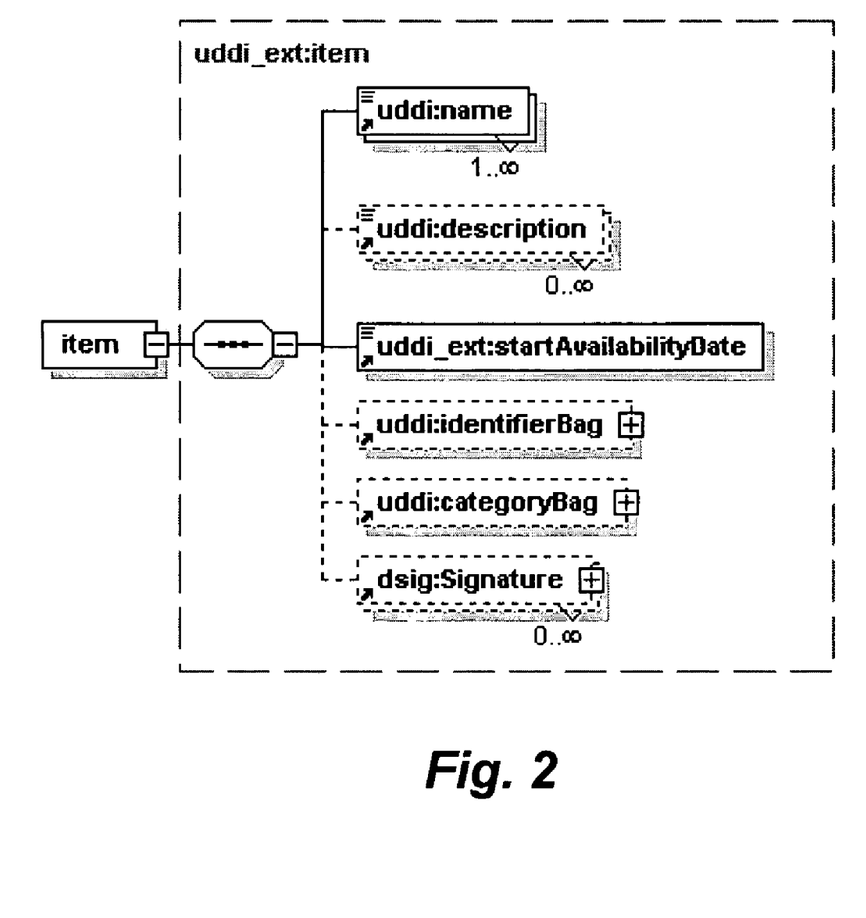
FIG. 2 illustrates an item data structure according to one embodiment of the invention.

FIG. 2 illustrates a data structure of item information, called item data structure, according to one embodiment of the invention. The data structure includes existing UDDI data types for descriptions, naming, identification and categorization. For example, the item data structure includes an existing UDDI type name, which is a human readable name of an item. The item data structure also includes an existing UDDI type description, which includes one or more short business descriptions of the item.

The item data structure also includes existing identifierBag and categoryBag UDDI data types. The identifierBag data type includes distinguishable identifiers of the item in order to distinguish one item present in the registry from another. In addition to a concrete identifier code, the identifierBag data type indicates the identifier type. For example, the type may be a Global Trade Item Number ("GTIN") (see the eanit.org web site for a definition of the GTIN system) and the identifier code may be 4000346627712, which is the GTIN for a given item. In one embodiment, the identifierBag data type may include several different identifiers for identifying the same item.

The categoryBag data type includes distinguishable categories for the item in order to allow category-based item searches. By way of example, categories may specify each item's type, the target market to which each item relates, the country in which each item is offered, . . . etc. Similar to the identifierBag, the categoryBag may indicate both the category and a category type. Continuing with the previous example, the categoryBag data type may specify the category type "United Nations Standard Products and Services Code" ("UNSPSC"), and the category 25172504, which is the UNSPSC code for "Automobile or Light Truck Tires." See the unspsc.org web site for a definition of the current UNSPSC system.

In one embodiment, information contained in both identifierBag and categoryBag data types is utilized in searching the UDDI standard-based registry for query keywords provided by the consumer (e.g., "Light Truck Tires"). In one embodiment, the item data structure includes the XML digital signature data type to enable data authenticity. Existing UDDI data types included in the items data structure are described in great detail in UDDI specifications. As such, no further description of the existing UDDI data types is necessary herein.

According to one embodiment of the invention, the item data structure also includes an extended data type, referred to herein as startAvailabilityDate, which indicates the date of first availability of the item. The startAvailabilityDate is one example of an item-specific extended data type that may be included in the item data structure. As another example, the item data structure may also include an itemManufacturer data type, identifying the manufacturer of the item, and itemShippingDate indicating the first available shipping date of the item, etc. Various additional extended data types may be employed within the item data structure while still complying with the underlying principles of the invention.

In one embodiment the item data structure may include additional data types. For example, the item data structure may include itemKey data type indicating a unique identification key for the item, which can be used by a consumer in a query searching for a particular item. The itemKey may be comprised of a sequence of alphanumeric characters assigned by the Web Services provider, the uniqueness of which is confirmed by the UDDI registry. The itemKey may also be a Universally Unique Identifier ("UUID"), assigned by the UDDI registry itself.

The item data structure may also include businessKey, identifying the businessEntity providing the item. The item data structure may also include deleted and visibility data types. The deleted data type indicates whether the item is logically deleted from the UDDI registry. The visibility data type indicates whether the item is in private mode, i.e. under development, or in public mode, i.e. available for viewing to the public.

Figure 3:
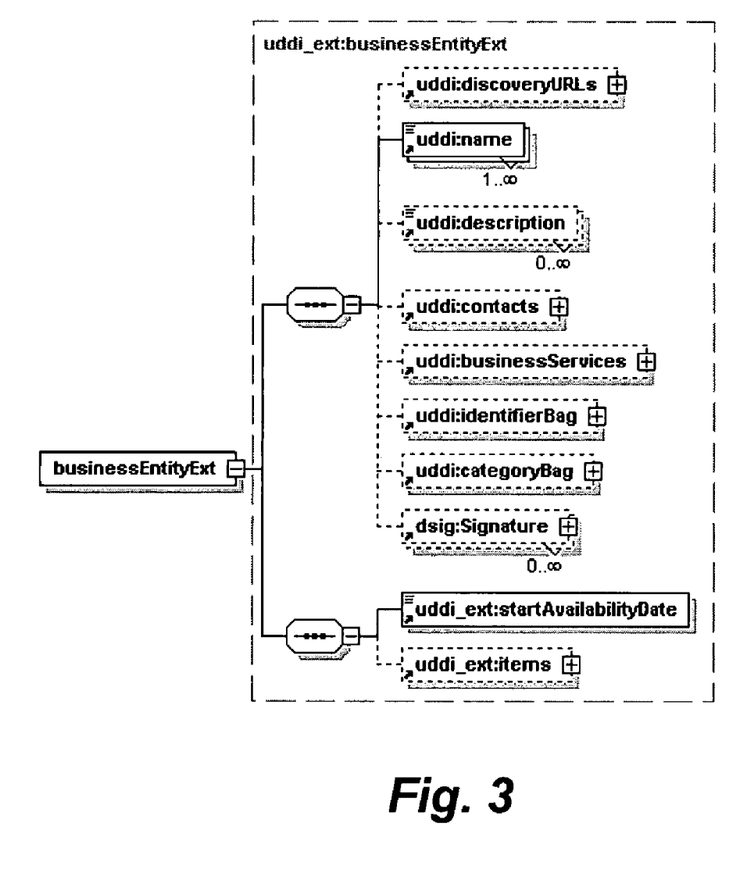
FIG. 3 illustrates a businessEntityExtended data structure according to one embodiment of the invention.

In one embodiment of the invention, the UDDI businessEntity structure is extended to incorporate the item data structure data. FIG. 3 illustrates the extended businessEntityExtended data structure according to one embodiment. The businessEntityExtended data structure includes existing UDDI data types of the businessEntity data structure, such as discoveryURLs, name, description, contacts, businessServices, identifierBag, categoryBag, Signature. The details of these data types may be found in the UDDI specifications developed by OASIS. It will be appreciated that the present invention is not limited to any versions of the UDDI specification and additional UDDI data types may be included, for example, into the businessEntityExtended data structure.

In addition, in one embodiment, the businessEntityExtended data structure includes items data types which include a list of the items that the business represented by the businessEntity structure provides. The items data type also includes the item data structure for every provided item. It will be appreciated that the item data structure may identify the business entity providing the item and the inclusion of the items data structure into the businessEntity Extended data structure may be optional. The businessEntityExtended data structure may include the businessKey data type uniquely identifying the businessEntity.

Application Programming Interfaces ("APIs")

In one embodiment of the invention, a set of Application Programming Interfaces ("APIs") are specified to access and modify data in the item and businessEntityExtended data structures. The new APIs include save_item, delete_item, find_item, get_itemDetail functions. The save_item API allows service providers to post new or updated item information into the UDDI standard-based registry. Upon posting new or updated item information, the save_item API returns an itemDetail structure including the saved item data to allow the Web Services provider to ensure that correct information has been posted in the registry.

Figure 4:
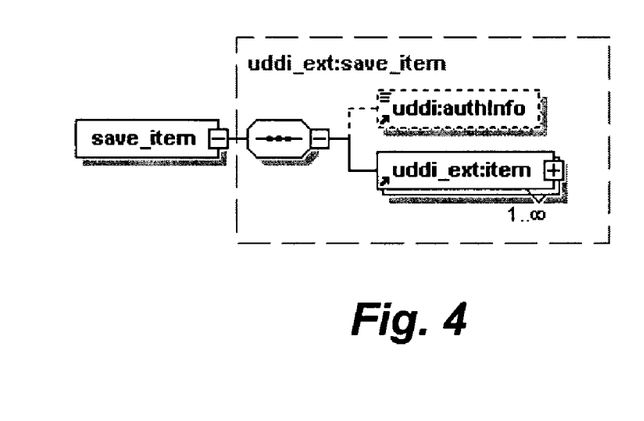
FIG. 4 illustrates a save_item Application Program Interface (API) according to one embodiment of the invention.

FIG. 4 illustrates the save_item API, which accepts authInfo and item arguments according to one embodiment of the invention. The authInfo argument, as described in the UDDI API specification, contains an authentication token of the Web Services provider publishing the information about the item in the registry. This is needed to ensure that only authorized entities can change item information in the registry. The item argument includes item data structure information.

Figure 5:
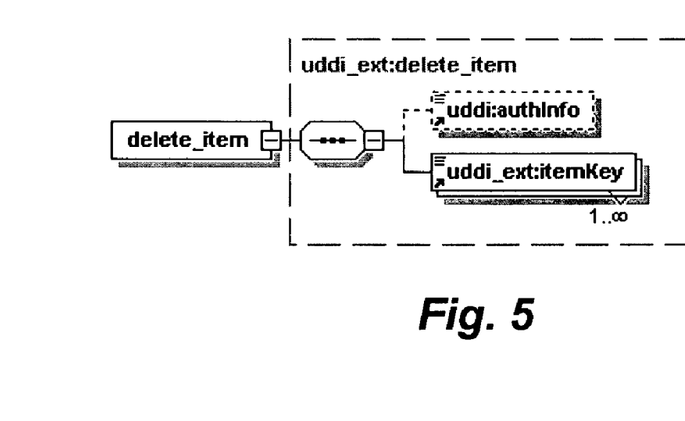
FIG. 5 illustrates a delete_item API according to one embodiment of the invention.

In one embodiment of the invention, the delete_item API allows Web Service providers to remove publication of item information from the registry. The delete_item API accepts two arguments, as illustrated in FIG. 5, according to one embodiment of the invention: authinfo and itemKey. As mentioned above, the authInfo argument includes an authentication token of the publisher to ensure that only authorized entities are able to delete item information from the registry. The itemKey argument includes a unique identification key of the item used to identify and delete the item from the registry. The delete_item API, upon execution, returns standard dispositionReport structure described in the UDDI specifications.

Figure 6:
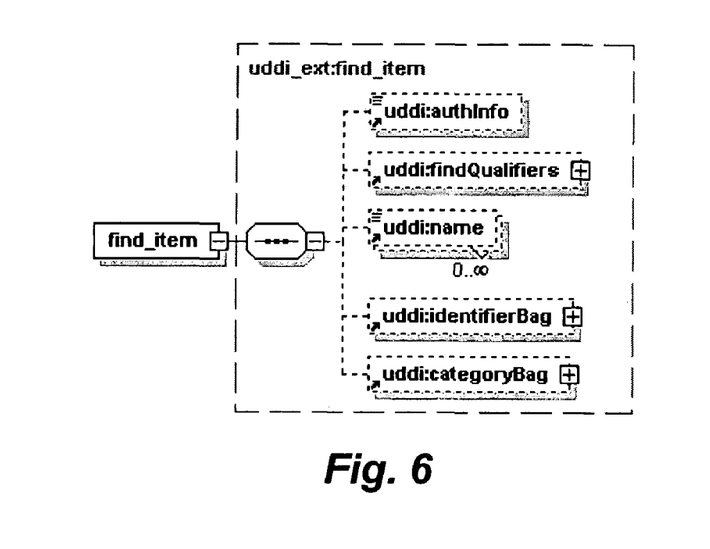
FIG. 6 illustrates a find_item API according to one embodiment of the invention.

FIG. 6 illustrates find_item API function arguments according to one embodiment of the invention. The find_item API is utilized to obtain identification information for a set of particular items, that is, the itemKeys, in the registry. The find_item API function accepts several arguments according to one embodiment. The authInfo argument is optionally used to authenticate the party making the request. The findQualifiers argument specifies logical operators, such as AND, OR, to use with the identifiers and categories provided in the identifierBag and categoryBag arguments. The name argument and identifierBag argument specify names and identifiers of the searched items, respectively. In one embodiment, find_item API may be invoked with null values for some of the arguments. For example, the name category may be null, and the consumer may search the items based on provided categories. The find_item API returns the itemList structure containing a list of itemKeys of items satisfying conditions specified by the values of the arguments.

Figure 7:
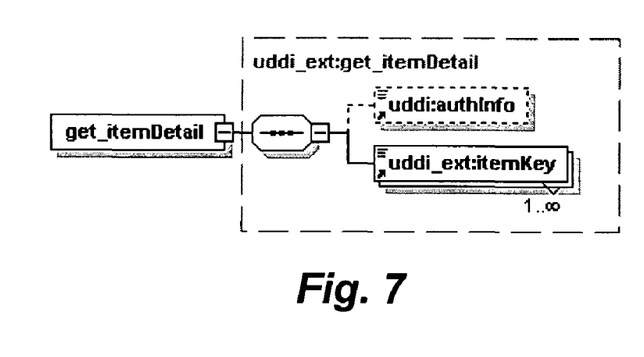
FIG. 7 illustrates get_itemDetail API according to one embodiment of the invention.

According to one embodiment of the invention, get_itemDetail is another extended API function. The get_itemDetail API returns item information based on itemKeys that are returned by the find_item API. The get_itemDetail API includes two arguments, authInfo and itemKey, both of which are described above. The information returned by the get_itemDetail API includes the complete item information published by service providers in the registry.

Qualifiers

The UDDI specification defines find Qualifiers, which are arguments provided to find API calls to override default behavior. For example, the UDDI specification specifies a caseSensitiveMatch qualifier, which overrides default case-insensitive search behavior of find API calls. According to one embodiment of the invention, a new findQualifier itemSubset is added to the existing UDDI standard find Qualifiers. The itemSubset find Qualifier selects service providers, which items are identified and categorized with the identifiers and categories provided as arguments to the find_business API module, which is defined in the UDDI specification. It will be appreciated that a variety of other findQualifiers may be added to the existing UDDI findQualifiers and the present invention is not limited to the itemSubset find Qualifier described above.

In one embodiment of the invention, additional information is included within the registry by means of the UDDI standard businessService and bindingTemplate data structures, which provide an indication of the electronic communication capabilities of each item supplier. Accordingly, after finding appropriate item suppliers, for example, based on the items offered, the Web service consumer can readily determine if they are capable of interacting with the item suppliers.

General

Figure 8:
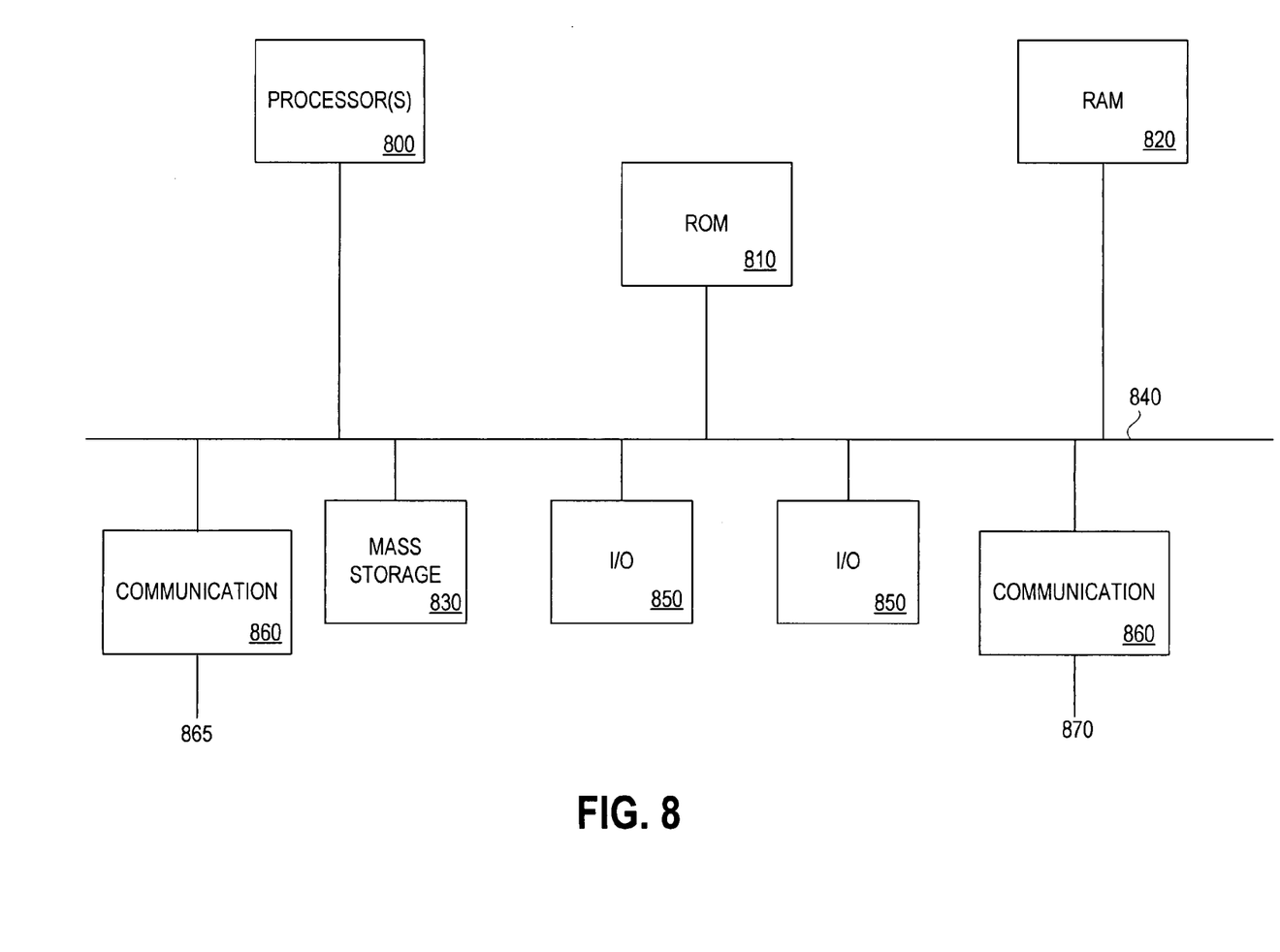
FIG. 8 illustrates an exemplary processing system according to one embodiment of the invention.

Above-described components may reside and be executed at processing systems, which may include systems such as conventional personal computers (PCs), embedded computing systems and/or server-class computer systems according to one embodiment of the invention. FIG. 8 illustrates an example of such a processing system at a high level. The processing system of FIG. 8 may include one or more processors 800, read-only memory (ROM) 810, random access memory (RAM) 820, and a mass storage device 830 coupled to each other on a bus system 840. The bus system 840 may include one or more buses connected to each other through various bridges, controllers and/or adapters, which are well known in the art. For example, the bus system 840 may include a 'system bus', which may be connected through an adapter to one or more expansion buses, such as a peripheral component interconnect (PCI) bus or an extended industry standard architecture (EISA) bus. Also coupled to the bus system 840 may be the mass storage device 830, one or more input/output (I/O) devices 850 and one or more data communication devices 860 to communicate with remote processing systems via one or more communication links 865 and 870, respectively. The I/O devices 850 may include, for example, any one or more of: a display device, a keyboard, a pointing device (e.g., mouse, touch pad, trackball), and an audio speaker.

The processor(s) 800 may include one or more conventional general-purpose or special-purpose programmable microprocessors, digital signal processors (DSPs), application specific integrated circuits (ASICs), or programmable logic devices (PLD), or a combination of such devices. The mass storage device 830 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 860 each may be any device suitable to enable the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, Internal data bus, or the like.

It will be recognized that many of the features and techniques described above may be implemented in software. For example, the described operations may be carried out in a processing system in response to its processor(s) executing sequences of instructions contained in memory of the device. The instructions may be executed from a memory such as RAM and may be loaded from a persistent store, such as a mass storage device, and/or from one or more other remote processing systems. Likewise, hardwired circuitry or firmware may be used in place of software, or in combination with software, to implement the features described herein. Thus, the invention is not limited to any specific combination of hardware circuitry and software, nor is it limited to any particular source of software executed by the processing systems.

CONCLUSION

Thus, a method for extending functionality of UDDI standard-based registry has been described. Although the invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of providing non-Universal Description, Discovery and Integration (UDDI) standard-complying extensions of functionality to a UDDI standard-complying registry, wherein the method comprises:

reading program code from memory and processing said program code with one or more processors to perform the following:

providing publishing and discovery services for a plurality of specific items available from a manufacturer, the plurality of specific items publicly viewable through a Web Service provider, wherein providing the publishing and discovery services comprises:

extending a UDDI standard-complying business entity structure with an item data structure, the item data structure to incorporate non-UDDI standard-complying item data corresponding to each of the plurality of specific items available from the manufacturer, wherein the non-UDDI standard-complying item data is not included with UDDI standard-complying registries;

publishing each respective specific item within the plurality of items by issuing a new Application Programming Interface (API) command extension to the extended UDDI registry to save a specified specific item into the item data structure causing the respective specific item to be published and publicly discoverable, wherein the new API command extension is a non-UDDI standard-complying UDDI registry command; and removing publication of one or more of the respective specific items from the item data structure to manage which of the plurality of specific items are published in the extended UDDI registry and publicly viewable.

2. The method of claim 1 further comprising:

searching for one or more of the plurality of specific items in the extended UDDI registry utilizing the new API command extension associated with the item data structure.

3. The method of claim 1 wherein the item data structure further includes an item identifier code.

4. The method of claim 3 wherein the item identifier code comprises a global trade item number code ("GTIN").

5. The method of claim 1 wherein the item data structure further includes a category data type that associates the specific item with a particular item category.

6. The method of claim 5 wherein the category data type comprises a target market to which the specific item relates.

7. The method of claim 5 wherein the category data type comprises a country in which the specific item is offered.

8. The method of claim 5 wherein the category data type comprises a United Nations Standard Products and Services Code.

9. The method of claim 1 wherein the specific item comprises a product for sale by the Web Service provider.

10. The method of claim 1 wherein the item data structure comprises an eXtensible Markup Language (XML) digital signature data type.

11. The method of claim 1 wherein the item data structure further includes a key data type indicating a unique identification key for the item.

12. The method of claim 1 further comprising searching for one or more of the plurality of the specific items utilizing at least one qualifier that narrows a field of potential matching specific items.

13. The method of claim 1, wherein the UDDI standard-complying business entity structure is further extended to incorporate information related to electronic communication capabilities of a provider of the plurality of specific items published from the item data structure.

14. A processor-based system comprising:
a processor;
a memory coupled with the processor;
a Universal Description, Discovery and Integration (UDDI) standard-complying registry; and
instructions to execute via the processor and memory to provide non-UDDI standard-complying extensions of functionality to the UDDI standard-complying registry by causing the processor-based system to perform the following operations:

providing publishing and discovery services for a plurality of specific items available from a manufacturer, the plurality of specific items publicly viewable through a Web Service provider, wherein providing the publishing and discovery services comprises:

extending a UDDI standard-complying business entity structure with an item data structure, the item data structure to incorporate non-UDDI standard-complying item data corresponding to each of the plurality of specific items available from the manufacturer, wherein the non-UDDI standard-complying item data is not included with UDDI standard-complying registries;

publishing each respective specific item within the plurality of items by issuing a new Application Programming Interface (API) command extension to the extended UDDI registry to save a specified specific item into the item data structure causing the respective specific item to be published and publicly discoverable, wherein the new API command extension is a non-UDDI standard-complying UDDI registry command; and removing publication of one or more of the respective specific items from the item data structure to manage which of the plurality of specific items are published in the extended UDDI registry and publicly viewable.

15. The processor-based system of claim 14 wherein the new API command extension comprises a save item function for posting a new specific item to the item data structure of the extended UDDI registry.

16. The processor-based system as in claim 15 wherein the save item function posts the new specific item in response to receiving information from the item data structure as an argument.

17. The processor-based system of claim 14 wherein the API comprises a delete item function for deleting a published specific item from the item data structure of the extended UDDI registry.

18. The processor-based system as in claim 17 wherein the delete item function deletes the published specific item in response to receiving information from the item data structure as an argument.

19. The processor-based system of claim 14 wherein the new API command extension comprises a item detail function for locating additional item information contained within the item data structure in response to receiving an item key as an argument.

20. The processor-based system of claim 14, wherein the UDDI standard-complying business entity structure is further extended to incorporate information related to electronic communication capabilities of a provider of the plurality of specific items published from the item data structure.

21. The processor-based system of claim 14, wherein the item data structure further includes a category data type that associates the specific item with a particular item category, and wherein the category data type specifies a target market to which the specific item relates.

22. An article of manufacture including program code stored on a non-transitory computer readable storage medium, wherein, when the program code is executed by a machine, causes the machine to perform a method of providing non-Universal Description, Discovery and Integration (UDDI) standard-complying extensions of functionality to a UDDI standard-complying registry, wherein the method comprises:

providing publishing and discovery services for a plurality of specific items available from a manufacturer, the plurality of specific items publicly viewable through a Web Service provider, wherein providing the publishing and discovery services comprises:

extending a UDDI standard-complying business entity structure with an item data structure, the item data structure to incorporate non-UDDI standard-complying item data corresponding to each of the plurality of specific items available from the manufacturer, wherein the non-UDDI standard-complying item data is not included with UDDI standard-complying registries;

publishing each respective specific item within the plurality of items by issuing a new Application Programming Interface (API) command extension to the extended UDDI registry to save a specified specific item into the item data structure causing the respective specific item to be published and publicly discoverable, wherein the new API command extension is a non-UDDI standard-complying UDDI registry command; and     removing publication of one or more of the respective specific items from the item data structure to manage which of the plurality of specific items are published in the extended UDDI registry and publicly viewable.

23. The article of manufacture of claim 22, wherein the UDDI standard-complying business entity structure is further extended to incorporate information related to electronic communication capabilities of a provider of the plurality of specific items published from within the item data structure.

24. The article of manufacture of claim 22, wherein the method further comprises:

searching for one or more of the plurality of specific items in the extended UDDI registry utilizing the new API command extension associated with the item data structure.

25. The article of manufacture of claim 22, wherein the item data structure further includes a category data type that associates the specific item with a particular item category, and wherein the category data type specifies a target market to which the specific item relates.

* * * * *